No. 797,411. PATENTED AUG. 15, 1905.
P. T. DODGE.
LINOTYPE MACHINE.
APPLICATION FILED JAN. 7, 1905.
9 SHEETS—SHEET 5.
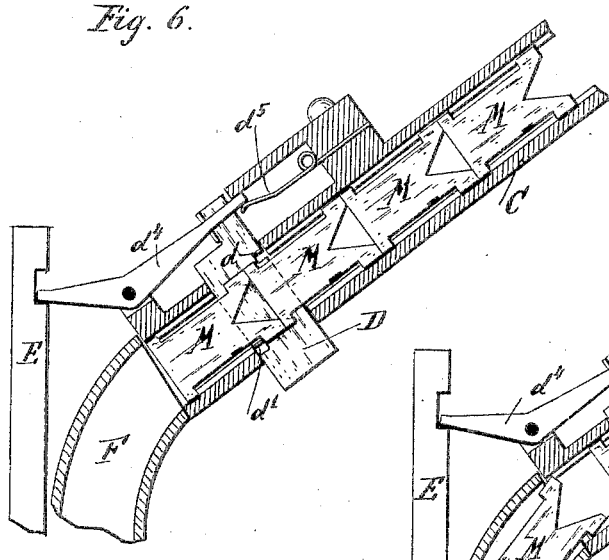
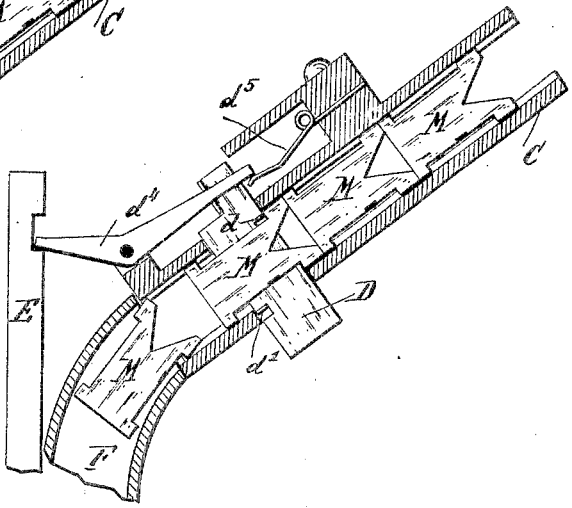
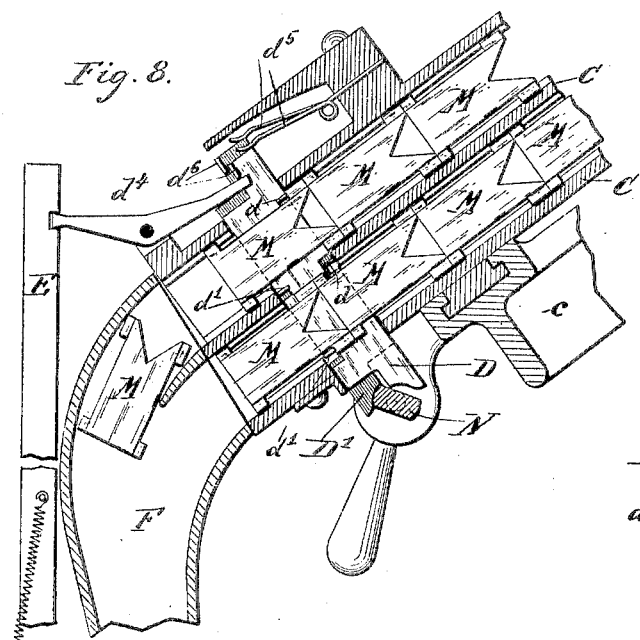
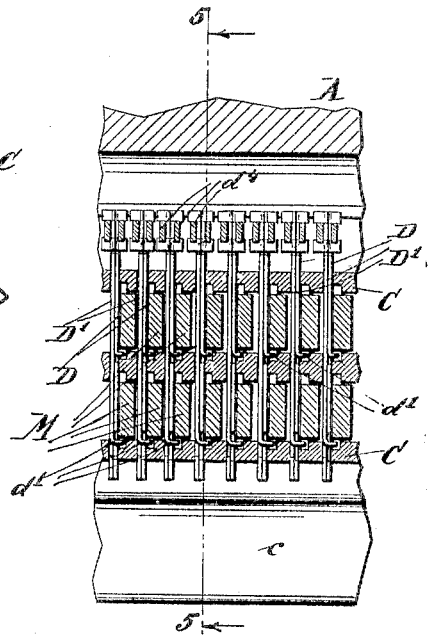
Witnesses.
Inventor:

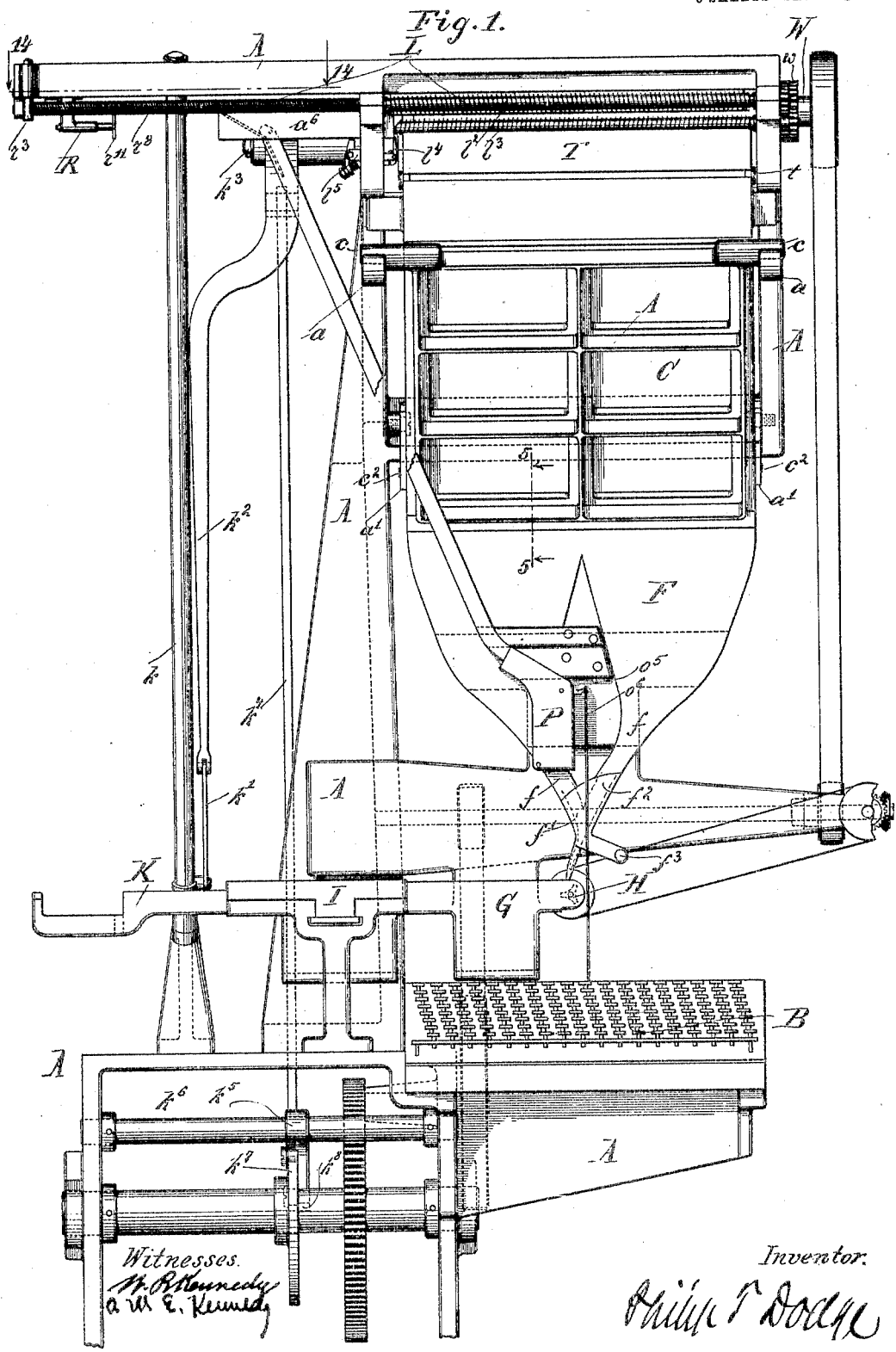

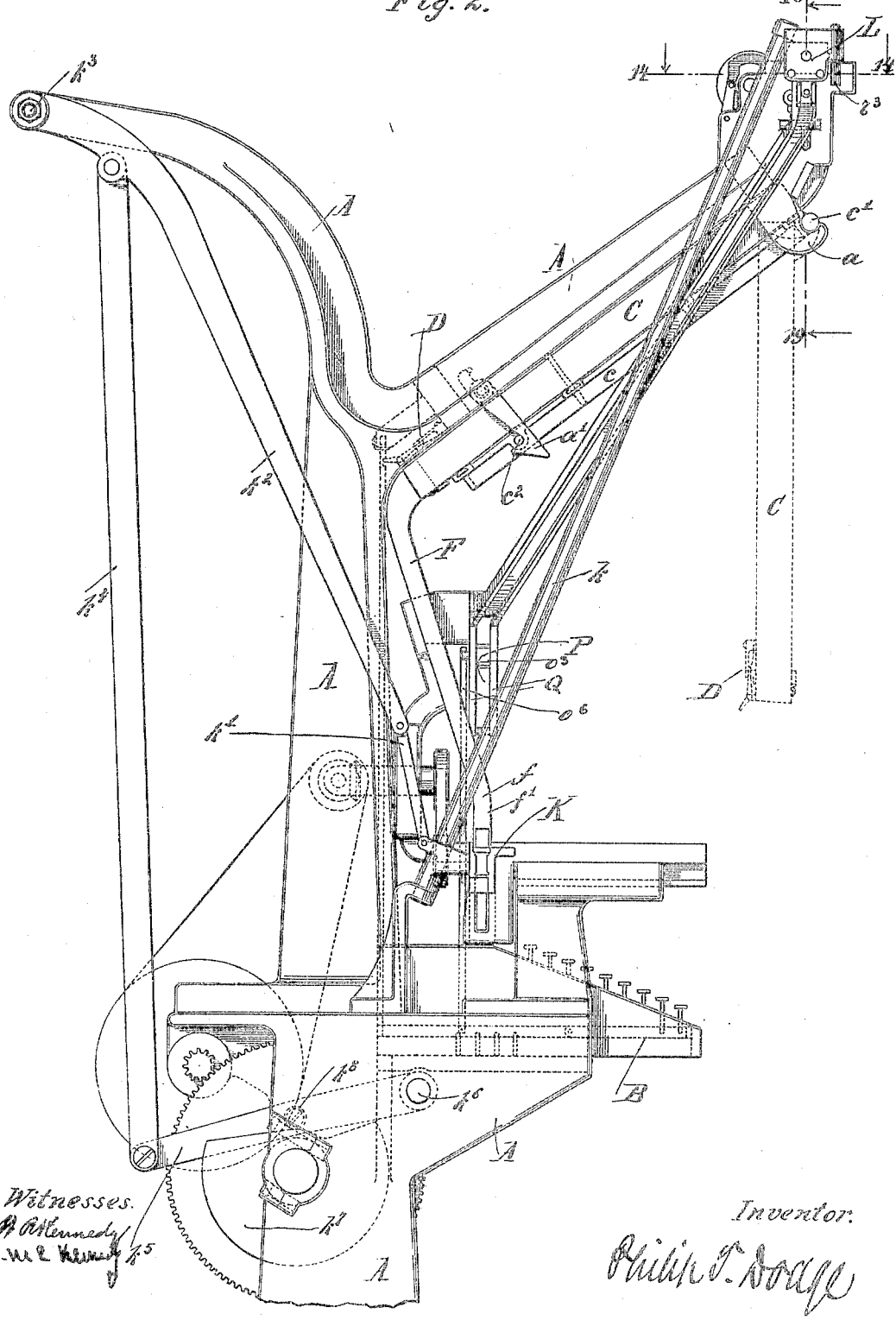

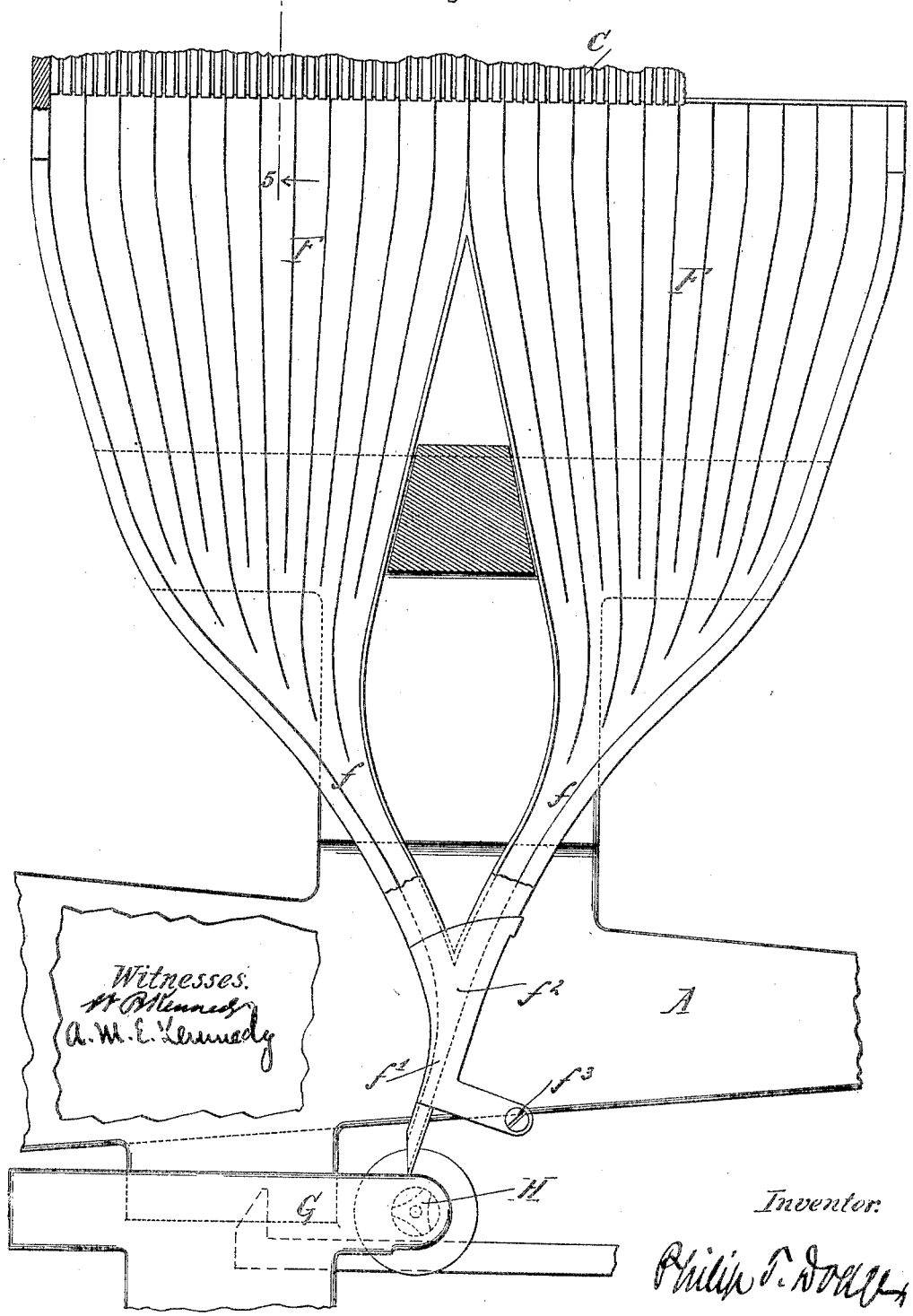

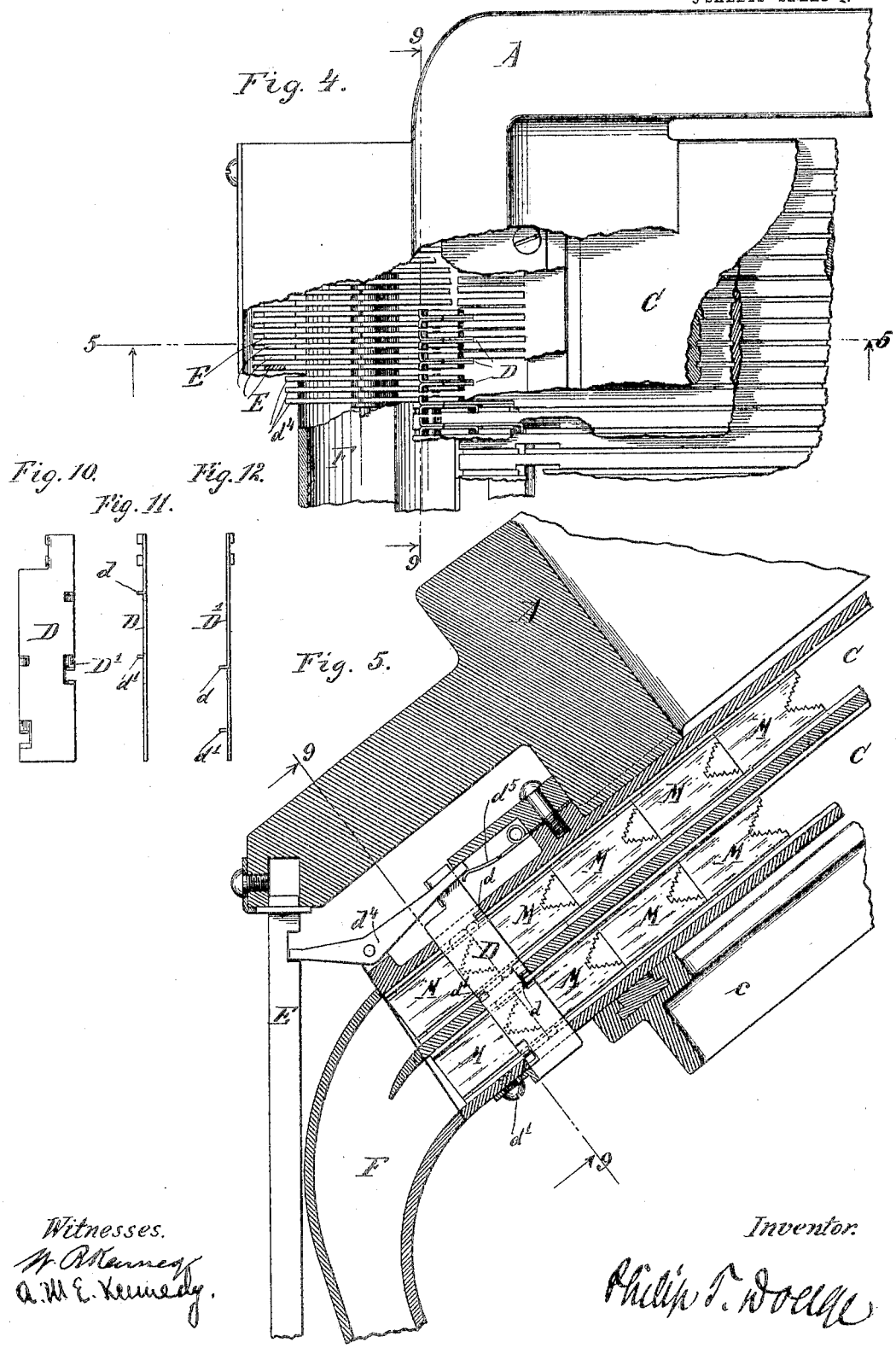

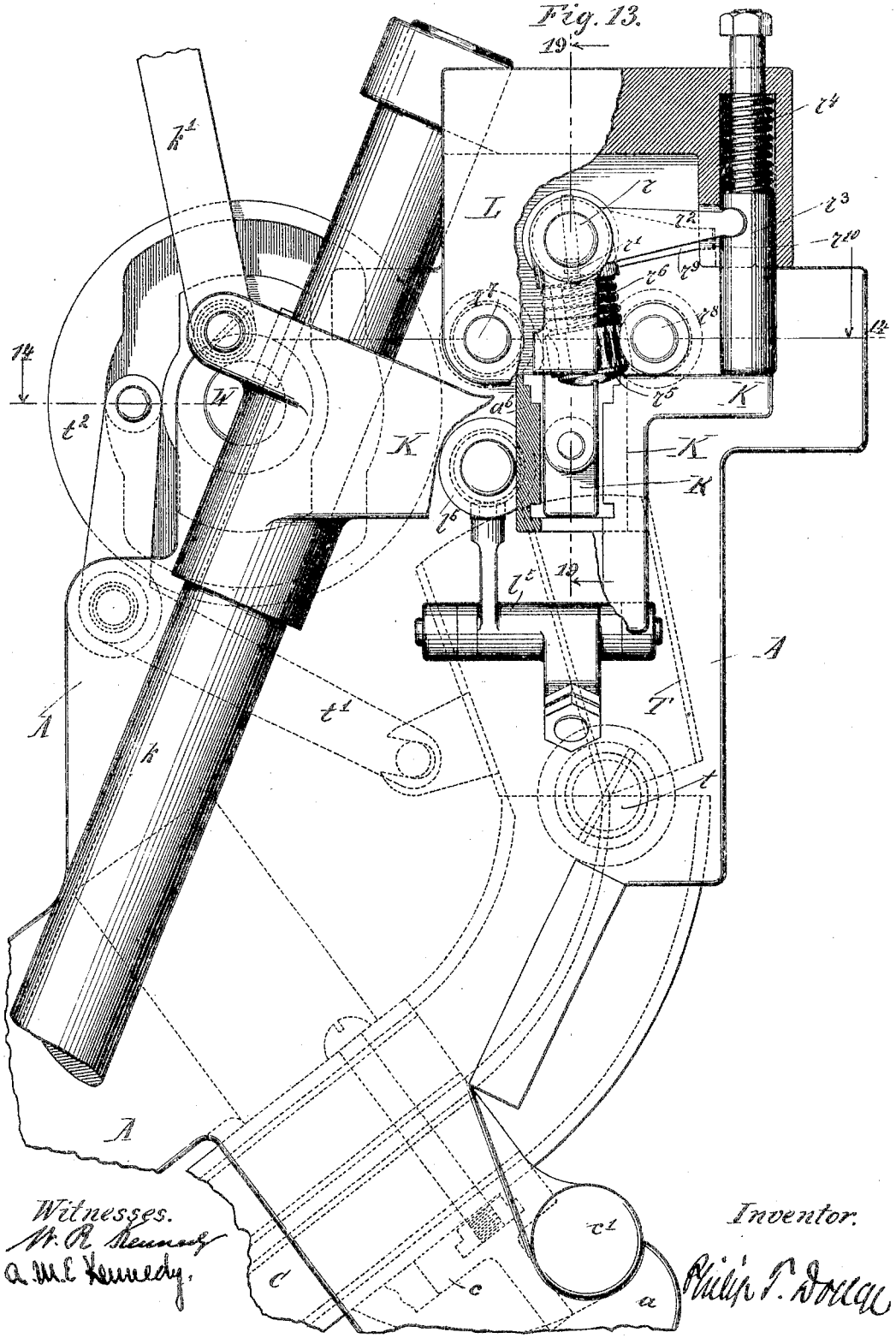

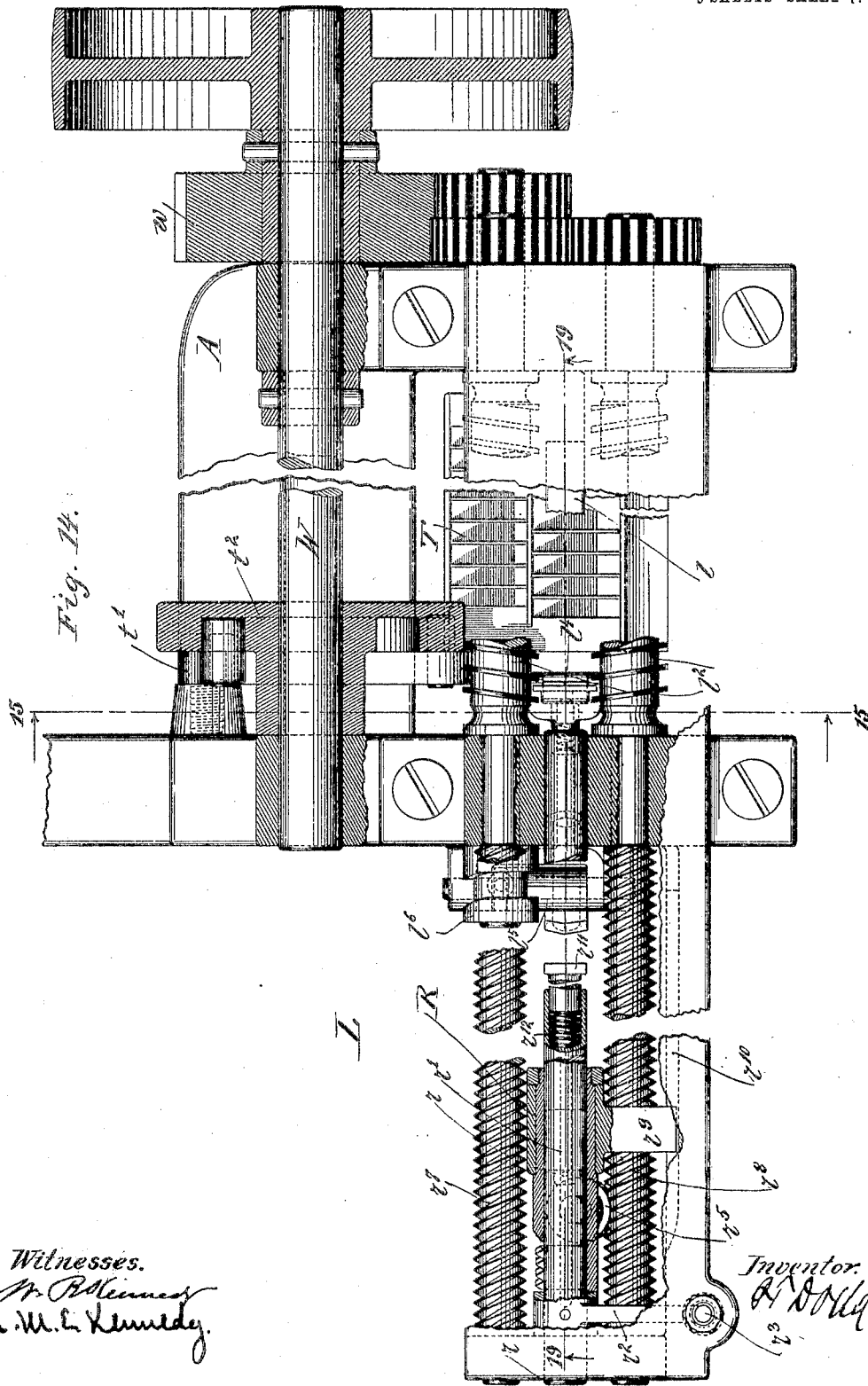

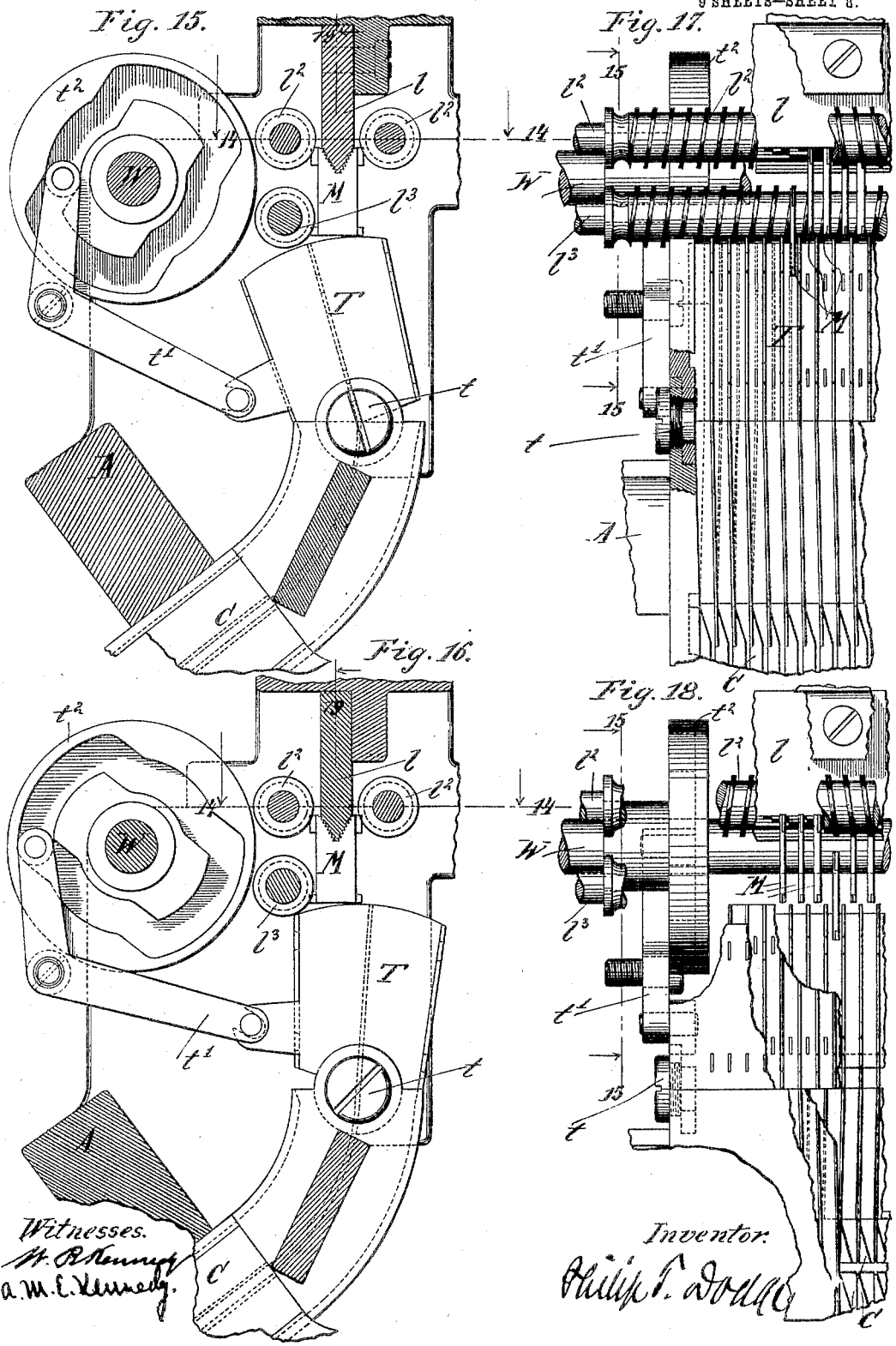

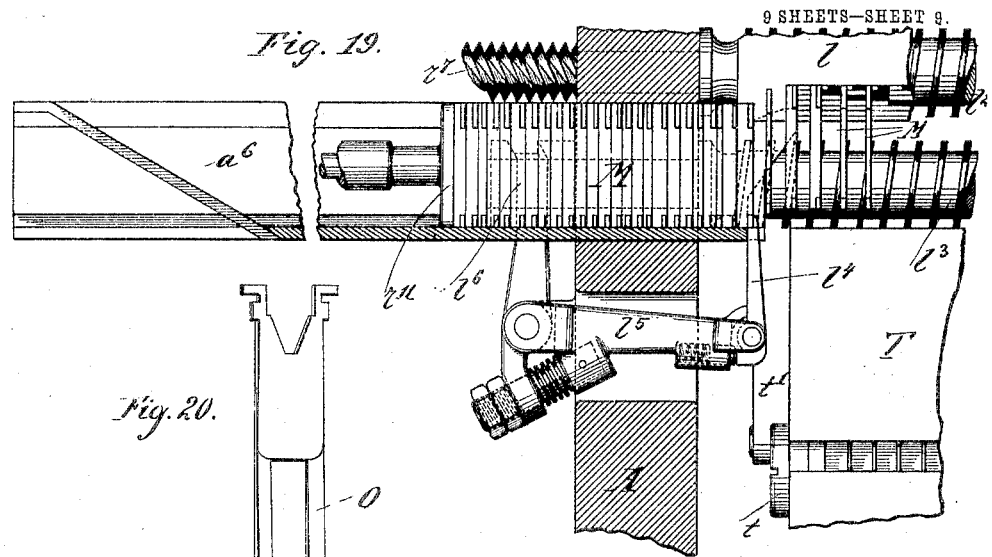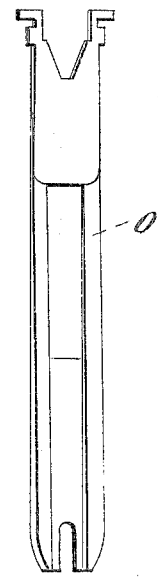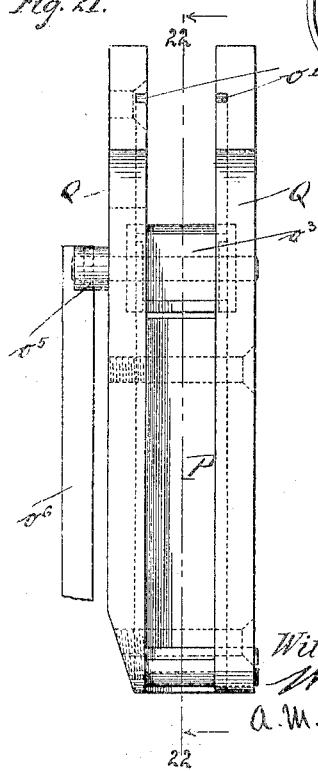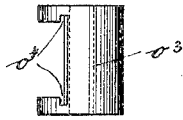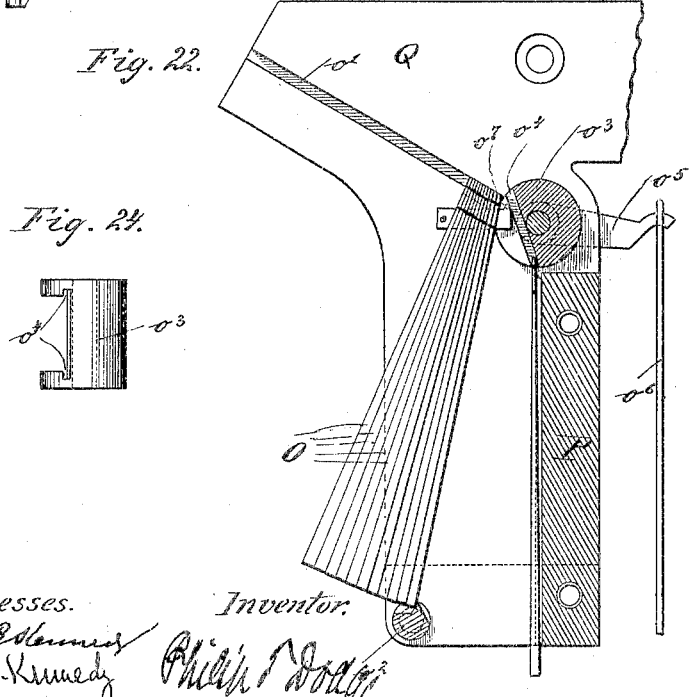

UNITED STATES PATENT OFFICE.

PHILIP T. DODGE, OF BROOKLYN, NEW YORK, ASSIGNOR TO MERGEN-
THALER LINOTYPE COMPANY, A CORPORATION OF NEW YORK.

LINOTYPE-MACHINE.

No. 797,411.          Specification of Letters Patent.          Patented Aug. 15, 1905.

Application filed January 7, 1905. Serial No. 240,130.

*To all whom it may concern:*

Be it known that I, PHILIP T. DODGE, of Brooklyn, county of Kings, and State of New York, have invented a new and useful Improvement in Linotype-Machines, of which the following is a specification.

My invention has in view the production of an improved composing and distributing mechanism for linotype and kindred machines wherein circulating matrices or dies are carried in magazines and released one at a time from the lower ends of the magazines by finger-keys, assembled in line for use at the casting mechanism, and thereafter returned at the upper ends of the magazines through a distributing mechanism to their appropriate channels.

The invention consists in an improved manner of constructing and mounting the magazine that it may be easily removed and replaced by another, in improved escapement devices to control the release of the matrices, in means for equalizing the time required for the travel of the matrices from different parts of the magazine to the assembling and composing point in order to prevent transpositions, in a peculiar arrangement of the magazine for the expanding spacers or justifiers to insure speedy delivery of the spacers to the line in course of composition in order to prevent transpositions when very wide magazines are employed, in means for transferring the composed line to the distributing mechanism, in various details of the distributing mechanism, and in means for delivering the matrices from one distributer to either the upper or the lower section of the duplex magazine, as may be demanded.

As my invention has reference only to the assembling and distributing mechanisms, I have limited the drawings thereto. The casting mechanism and other parts of the machine may be of the same character as those used in the Mergenthaler linotype machines of commerce or of any other suitable construction.

Referring to the drawings, Figure 1 represents a front elevation of a machine, the upper part of the machine having my improvements incorporated therein. Fig. 2 is an elevation of the same looking from the left side. Fig. 3 is a front elevation, on an enlarged scale, of the guides for directing the matrices from the magazine to the assembling-point, together with the adjacent parts. Fig. 4 is a plan view of the lower end of the magazine with portions broken away to show the interior parts. Fig. 5 is a longitudinal vertical section of the same on the line 5 5, Figs. 1, 3, 4, and 9. Figs. 6 and 7 are diagrammatic views illustrating the action of the escapement devices incorporated in a single magazine. Fig. 8 is a modified arrangement of the escapement devices shown in Fig. 5. Fig. 9 is a section on the line 9 9, Figs. 4 and 5, illustrating the escapement devices. Fig. 10 is a side view of two adjacent escapement-slides as shown in Figs. 4, 5, and 9. Figs. 11 and 12 are edge views of the same. Fig. 13 is a side elevation of the distributing mechanism and attendant parts viewed from the right side of the machine. Fig. 14 is a top plan view of the receiving end of the distributer, with portions broken away, on the line 14 14, Figs. 1, 2, 13, 15, 16, &c. Fig. 15 is a vertical section through the distributer on the correspondingly-numbered line of Figs. 14, 17, and 18 with the parts in position to deliver matrices to the lower section of the magazine. Fig. 16 is a similar section with the parts adjusted to deliver matrices to the upper section of the magazine. Figs. 17 and 18 are rear elevations of the parts shown in Figs. 15 and 16 with portions broken away. Fig. 19 is a vertical central section through the receiving end of the distributing mechanism on the line 19 19, Figs. 2, 13, 14, &c. Fig. 20 is a view of one of the spacers. Fig. 21 is a rear elevation of the space-box. Fig. 22 is a vertical section of the same on line 22 22, Fig. 1. Fig. 23 is a plan of same, and Fig. 24 is a detail view of the rocker forming part of the escapement mechanism of the space-box.

Referring to the drawings, A represents the rigid main frame, the form of which may be varied at will, provided it is adapted to sustain the parts hereinafter described.

B is the keyboard, fixed rigidly to the front of the main frame and provided with a series of finger-keys for operating the escapement devices to release the selected matrices from the magazine.

C is the fixed inclined magazine in which the matrices are stored; D, the escapement mechanism at the lower end of the magazine for releasing the matrices one at a time, and E E the key bars or rods connecting the escapements with the finger-keys.

F is the channel-plate or raceway through which the released matrices are guided downward to the assembler-channel G in front of the star-wheel H, by which they are carried laterally and the growing line moved forward against a yielding resistant, as usual.

I is a horizontal guide or channel through which the composed line, commonly known as the "matrix-line," is delivered.

K is an elevator to which the line is finally delivered and by which it is lifted to the distributing mechanism at the top of the machine.

L is the distributing mechanism through which the matrices are delivered to the upper end of the magazine.

In the form shown the magazine C is of the duplex type—that is to say, it consists of two duplicate magazines or chambers, one overlying the other and each adapted to receive an entire font or set of matrices. Each chamber consists, as in the ordinary linotype-machine, of two parallel plates grooved in their inner or opposing faces to receive and guide the upper and lower edges of the matrices M, which are received at the upper end. A single central plate grooved in both its upper and under sides, as shown, serves as the bottom of the upper chamber and the top of the lower chamber. The matrices are delivered into the upper ends of the channels from the distributer and descending by gravity are released one at a time from the lower end of the magazine by the escapement devices.

The magazine as a whole is a rigid structure comprising the magazine-chambers proper and underlying frame $c$, the parts being secured strongly together by screws or equivalent connections. It will be observed that the magazine is located at the front of the machine overlying the keyboard and that it is secured to the under side of the main frame. In order that the magazine may be thus applied and conveniently removed, as hereinafter described, the upper part of the main frame is extended outward and upward, or, in other words, arranged to overhang, as shown, in such manner that an open and unobstructed space exists below this overhanging portion. As regards the construction of the overhanging portion of the frame the essential requirement is that it shall be adapted to receive and sustain the inclined magazine to permit it to swing downward from the operative position and admit of its being introduced and removed directly—that is to say, without being passed over elevated supports or other obstructions, as heretofore. The magazine is provided at the upper end with pivots or trunnions $c'$, seated on depending ears $a$ of the main frame, while the lower end is provided with lateral studs $c^2$, engaged by latches $a'$, pivoted to the main frame. By releasing the latches the magazine is permitted to swing downward and forward, so that it is suspended from the main frame, as indicated in dotted lines in Fig. 2. In this position it may be conveniently grasped at the two edges by an attendant standing in front of the machine, who is thus permitted to conveniently lift the magazine out of the machine, so that it may be replaced by another containing matrices in different variety. In applying the substitute magazine it is only necessary to seat the trunnions on the ears $a$ and then swing the lower end of the magazine upward and rearward until it is engaged by the latches. As the magazine and contained matrices are of considerable weight—commonly from seventy-five to eighty pounds—the extension of the frame forward and the suspension of the magazine thereon in the manner shown are of decided advantage, as they permit the magazine to be safely and conveniently applied and removed without lifting it at arm's length, reaching over the frame, or carrying it above its normal position, as required in ordinary linotype-machines. The fact that the magazine may be instantly dropped to the pendent position is also of advantage in that it permits convenient inspection and adjustment of the escapements without removing the magazine from the machine.

While I have illustrated the double magazine in Figs. 1, 2, 5, &c., it is obvious that a single magazine—that is to say, a magazine having a single chamber, as shown in Figs. 6 and 7—may be applied to the main frame in the same manner as the double magazine.

In order to adapt the machine to carry a large assortment of matrices, I propose to make it of greater width than usual. It is therefore necessary to provide means for equalizing the time required for the travel of the matrices from the different channels of the magazine to the assembling-point in order to prevent the transpositions which would otherwise occur. If two matrices required to travel different distances, or one by a more direct route than the other, are released in rapid succession, the second matrix will sometimes reach the assembling-point ahead of the other. To overcome this difficulty, I arrange the channels of the plate or raceway F, as shown in Fig. 3, in two groups, one to the right and the other to the left of the central line and of the assembling-point. Those of each group converge from the upper toward the lower ends, where they deliver into a throat $f$. The two throats $f$, one for each group, are continued downward in converging lines and finally merge in a single throat or passage $f'$, which delivers the matrices into the assembler in front of the star-wheel or other assembling mechanism. It is found that the two groups of converging channels delivering to a common central throat will deliver the matrices at practically uniform speed from the magazine to the line. The arrangement of the channels may be modified within reasonable limits, provided their mode of action is not materially changed. The essence of the invention lies in dividing the wide series of channels into groups, arranging those of each group in converging lines, and finally connecting the groups at the lower ends through converging passages with a common throat.

It is well known to those skilled in the art that it is not possible to deliver matrices from different points in a very wide magazine in equal times to an assembling-point through channels which converge directly from the magazine to the assembling-point. I have discovered that by dividing the large number of channels into groups, arranging those of each group to converge at one point, and then connecting these points of the several groups by secondary converging channels I am enabled to equalize the run or travel of the matrices, so that although released in rapid succession they will reach the line in the proper order without danger of transposition.

In order to permit access to the throats $f\,f'$, I form the latter and the lower ends of the former in a plate $f^2$, mounted on a horizontal pivot $f^3$, so that it may be turned to one side.

For controlling the discharge of the matrices from the magazine I have provided a novel escapement mechanism, such as shown in Figs. 2, 4, 5, 6, 7, 8, 9, 10, and 11. In Figs. 6 and 7 I have shown the escapement applied to a single magazine—that is to say, a magazine with a single chamber. Each escapement, as shown in Figs. 6 and 7, consists simply of a movable plate D, arranged to slide upward and downward through a slot in the magazine and provided on one side with two lips $d$ and $d'$, intended to engage the upper and lower edges, respectively, of the matrices. The matrices are constructed, as usual, with ears or shoulders on the edge near opposite ends. The shoulders $d$ and $d'$ of the escapement-slide are placed out of line with each other, one at the forward and the other at the rear edge of the plate. They are in such relation to each other that when the slide stands in its elevated and normal position, as shown in Figs. 5 and 6 and in the lower chamber of Fig. 8, the lower lip $d'$ will be seated in front of the upper shoulder on the foremost matrix, while the upper lip $d$ will be above the level of the matrices and out of action. When a matrix is to be discharged, the slide is depressed, the effect of which is to carry the lip $d'$ downward, as shown in Fig. 7, out of engagement with the foremost matrix, which is thus permitted to escape. At the same time the upper lip $d$ is carried downward in front of the upper shoulder on the second matrix, which is thus prevented from passing out of the magazine. As soon as the foremost matrix is clear of the escapement the latter again rises and assumes its original position. In so doing and before the upper lip $d$ is lifted clear of the upper edge of the matrix the lower lip $d'$ rises in position to encounter the upper shoulder on the lower edge, so that the second matrix is permitted to assume the position previously occupied by the one discharged. The escapements may be actuated by any suitable mechanism. As shown in Figs. 5 and 6, they are acted upon by a depressing-lever $d^4$, centrally pivoted to the frame and urged upward at the inner end by a lifting-spring $d^5$ to keep the parts in normal position. A vertically-sliding key-bar E is connected with the keyboard to actuate the lever and depress the escapement-slide when a matrix is to be discharged.

The essential features of my escapement are two lips arranged to engage opposite edges of the matrices as the escapement is moved upward and downward. I believe myself to be the first to provide an escapement operating on this general plan, and it is to be understood that the form and proportions of the parts may be varied at will, provided the mode of action is essentially such as that described.

In Figs. 2, 4, 5, and 8 I show my escapements in connection with the double magazine.

In order to permit convenient construction and assemblage of the parts in the double magazine, I prefer to arrange the escapements side by side in pairs, each pair in one and the same slot, as shown in Figs. 4, 5, 9, and 10, one escapement D having its lips on the upper end in order to control the matrices in the lower section of the magazine, while its companion D' has lips on the lower end in position to control matrices in the upper section.

Each escapement may be controlled in the double magazine, as shown in Fig. 5, by a centrally-pivoted lever $d^4$, urged upward at its inner end by a spring $d^5$ and connected at its outer end with one of the actuating key bars or reeds E, hereinabove referred to. When each escapement is actuated by its own lever and reed, it is obviously necessary to have in the machine a number of keys equal to the number of different characters in the two sections of the magazine. To overcome this necessity and provide for controlling the escapements of either magazine by one and the same set of keys, I propose to connect the two escapements of each pair with one and the same actuating-lever and to provide means whereby the escapements of either magazine may be locked out of action while the others are permitted to operate. Various arrangements to this end may be adopted; but in Figs. 8 and 9 I have shown a simple construction. Each of the two escapements in this modified construction has at the upper end a projection $d^6$, with which it rests on the operating-lever $d^4$. Each escapement is in this case necessarily independently actuated by a spring $d^5$, which depresses it as soon as the corresponding key of the keyboard is depressed. The lower ends of the two escapements are terminated in different planes, one forward of the other, and below them there is mounted a rock-shaft N, having flattened surfaces. When this shaft is rocked in one direction, it has the effect of locking the escapement D in its elevated position, so it will not follow the action of its spring $d^5$ when the key is depressed, while escapement D' is free to do so. When rocked in the opposite direction, the escapement D' will be locked and the escapement D be free for action. Any similar contrivance which will lock one set of escapements at a time may be substituted for the rock-shaft.

For the purpose of justifying or elongating the composed line of matrices to the predetermined length I propose to make use of expansible wedge-spacers O, Fig. 20, of the Schuckers type, used in the ordinary linotype-machine, each consisting of a short thin wedge provided with suspending ears and a longer and oppositely-tapered wedge connected with the first by a longitudinal sliding joint, so that after the device as a whole is inserted in the line between the matrices the longer wedge may be pressed up through the line past its companion in order to increase the thickness of the space in the line in a manner well understood by those skilled in the art. In order to permit the introduction of these spacers quickly into the line, I provide, as shown in Fig. 1, a magazine P, located at a central point directly over the assembling-point, and the star-wheel H, so that the spacers may be dropped from this magazine directly and vertically into the line. This spacer-magazine may be of any suitable construction, but I recommend the construction shown in Figs. 21 to 24, in which Q Q represent two parallel stationary walls at such distance apart as to admit the spacers between them. They are provided with inclined grooves $o'$ to receive the ears of the spacers and hold them in suspension, with the lower end of the foremost spacer resting against a transverse shoulder $o^2$, provided for the purpose. At the lower ends of the grooves I mount transversely in the magazine a cylindrical rocker $o^3$, the rear side of which is recessed to admit the upper end of a spacer and also provided with grooves $o^4$, through which the ears of the spacer may pass. The rocker is provided with an arm $o^5$ to receive an actuating-rod $o^6$, leading to the keyboard. Behind the rocker I provide on the inner walls shoulders $o^7$ to engage the ears of and prevent the escapement of the foremost spacer. When the rocker stands in the position shown in Fig. 22, the escape of the foremost spacer is prevented. When, however, the rocker is turned back until the rear ends of the grooves $o^4$ are in line with the ears of the foremost spacer, the latter will be crowded forward by the weight of those behind, so that the ears will enter the grooves. If the rocker be then turned forward, the spacer, with its ears in the grooves, will be lifted clear of the stop-shoulders $o^7$, whereby it is permitted to slide downward and forward through the rocker and descend to the line, as shown in Fig. 16, the next spacer immediately taking the place of the one discharged. The location of the spacer-magazine at a central point—that is to say, at or near the middle of the width of the magazine—so that the spacers may directly enter the line while the matrices approach the line from the right and left of the line through which the spacer falls, is of decided advantage.

By reference to Fig. 2 it will be seen that the channeled raceway F, through which the matrices descend, has an inclined position and approaches the vertical plane in which the assembler and the spacer-magazine are situated with an inclination from one side. This is allowable, since the short matrices will pass easily and without being checked in speed around the short turn at the foot of the raceway, where it delivers into the assembler. It will be seen that the inclination of the raceway F, so that the matrices descend toward the line from one side, permits the spacer-magazine to be arranged directly over the line and at a short distance therefrom, an arrangement which would not be possible were the raceway arranged in a vertical position. When the parts are arranged as shown, the long spacers, which must pass through and below the line and which cannot be guided through a tortuous channel, are delivered to their places very speedily and so that there is no danger of their falling after the more rapidly moving and more easily guided matrices.

After the composition of the matrices and spacers is completed the line is shifted to the left, as usual, and presented to a casting mechanism foreign to the present invention. It is thereafter transferred farther to the left, by hand or by any suitable mechanism, into the vertically-channeled elevator K. This elevator slides on a fixed inclined guide-bar $k$, attached to the main frame, and is actuated through a link $k'$ from a lever $k^2$, pivoted at its upper end to the main frame at $k^3$ and receiving motion in turn through a link $k^4$ from lever $k^5$, pivoted at $k^6$ to the main frame and actuated by a lifting-cam $k^7$, bearing beneath a stud or roller $k^8$ on the side of the lever. The arrangement of parts and the form of the cam are such that the elevator K is lifted from the assembling-level, with a line of matrices and spacers therein, to the distributing-level at the top of the machine with a dwell in each position, so that the matrices may be moved into and out of it. When the elevator reaches its uppermost position, it comes to a solid bearing under the top of the frame and in position to admit of the matrix-line being pushed horizontally to the right, out of the elevator, and between the rigid supporting-rails $a^6$, forming part of the main frame, and this preparatory to the transfer of the matrices one at a time to the distributing devices.

The distributer proper consists of a small horizontal bar $l$, overlying the upper end of the magazine and having its lower edge of V form, provided with longitudinal permuted teeth designed to engage corresponding teeth in the upper notched ends of the matrices M for the purpose of holding them in suspension as they are carried along the bar until they arrive over their appropriate channels in the magazine. The movement of the matrices along the bar is effected by means of the horizontal screws $l^2$ $l^3$, which engage their edges. The matrices are lifted one at a time from the inner end of the advancing line and into engagement with the screws by a vertically-reciprocating finger $l^4$, Fig. 19. These parts are essentially the same in action as those used in the commercial linotype-machine and described in Letters Patent of the United States No. 436,532.

For the purpose of advancing the composed line out of the elevator to its position between the supporting-rails $a^6$ and applying a continuing yielding pressure, so that the line may advance step by step as the successive matrices are removed from the inner end, I employ the novel mechanism shown in Figs. 1, 2, 13, and 14. R represents the pusher, arranged to slide on a horizontal sustaining-rod $r$ in the main frame. They are connected by a longitudinal spline or feather $r'$, and the rod is provided with a lateral arm $r^2$, through which it may receive a slight rocking motion from a vertical bolt $r^3$, seated in the main frame and urged downward by a spring $r^4$, Figs. 13 and 14, arranged in position to be lifted by the line-elevator K when it reaches its uppermost position, as shown in Fig. 13. The pusher is provided with a depending arm carrying at its lower end a horizontal pinion $r^5$, subject to the pressure of a spring $r^6$, by which it is frictionally held to prevent its rotation under ordinary conditions. This pinion is arranged to engage alternately through the rocking motion of its carrying-arm two screws $r^7$ and $r^8$, which are preferably outward continuations of the matrix-carrying screws, but with V-threads of greater pitch. When the pinion engages one screw, the latter acts to move the pinion, and with it the matrix-pusher R, forward in order to crowd the line of matrices before it toward the lifting-dog. When, however, the pinion engages the other screw, a reverse movement of the parts takes place—that is to say, the pusher is retracted to a position outside of the next line to be presented to the elevator. As the matrices removed at the front of the line will differ widely in thickness, the pusher must advance with irregular moves or at uneven speed. This is accomplished by means of the frictionally-held pinion, which will turn on its axis, and thus permit the pusher to stop or to move more slowly whenever the resistance of the line is sufficient to overcome the spring-friction by which the pinion is held. In other words, the pinion serves as a yielding connection between the feed-screw and the pusher actuated thereby. It is necessary to maintain the carrier-pinion in engagement with the advancing screw until the entire line of matrices has been distributed, and this although the elevator K may in the meantime descend to receive the next line. For this purpose I provide the pusher with a second laterally-extended arm $r^9$, Figs. 13 and 14, arranged to traverse a horizontal slot $r^{10}$ in the side of the frame. When the elevator K rises and presents the line in front of the carrier, lifting the pin $r^3$ and rocking the pinion into engagement with the right-hand screw, as before described, it also has the effect of rocking the end of the arm $r^9$ upward to the level of the slot $r^{10}$, which is entered by the arm the instant that the slide begins its advance. The arm traveling in the groove will maintain the operative connection of the pinion until the carrier completes its forward movement, when the arm will have arrived over a portion of the slot which is open or cut away at the bottom, thus allowing the arm to drop down, so that the carrier may swing around the guide-rod $r'$ and throw the pinion out of engagement with the advancing screw and into engagement with the retracting screw, whereupon the pusher will be moved outward, as before explained. This reversal of the parts is insured by the downward movement of the spring-actuated plunger $r^3$, before referred to. In order to give the parts a smooth and easy action, the forward end of the carrier is provided with a pressure-plate $r^{11}$ to act upon the matrices, this plate having its supporting-shaft seated in the front end of the pusher and sustained by a spring $r^{12}$, as shown in Fig. 14.

The matrix-lifting dog $l^4$, as shown in Figs. 14 and 19, is pivoted to one end of an elbow-lever $l^5$, the opposite end of which is actuated by a grooved cam $l^6$ on one of the distributer-screws.

The wedge-spacers in the composed line are lifted with the matrices by the elevator K, and as the line is advanced horizontally by the pusher R toward the distributing devices the ears of the spacers enter inclined grooves $a^{10}$ in the rigid rails $a^6$, whereby the spacers are permitted to descend and escape from the matrix-line into the inclined chute or tube $a^{11}$, which directs them into their magazine P. This method of separating the spacers from the matrices is old in the art and is not claimed herein. The tube $a^{11}$ is seated at its lower end removably in the magazine P and may be detached at will.

The matrices falling from the distributer-bar according as they belong to one font or another must be guided into the lower or upper section of the magazine. For this purpose I provide, as shown in Figs. 1 and 15 to 18, a rocking throat or guide T, turning on a horizontal axis $t$ at the upper end of the magazine. This throat is provided with two series of channels corresponding with the various magazine-channels and is connected through a lever $t'$ with a grooved cam $t^2$, the rotation of which will rock the mouthpiece to and fro and lock it in the two positions shown in Figs. 15 and 16. In the first position the falling matrices will be deflected through the right-hand channels of the throat or mouthpiece into the lower section of the magazine. In the second position, on the contrary, the matrices will pass through the left-hand channels of the throat into the upper section of the magazine. The cam-wheel $t^2$ may be turned and set in its different positions by hand or by suitable connections under the control of the operator. It stands normally at rest and is moved only when a change is to be made in the delivery of the matrices. It is preferably sustained loosely on the driving-shaft W, carrying a pinion $w$, through which distributer-screws are driven, as usual in linotype-machines.

While I prefer to employ the trunnions on the magazine and the supporting-hooks on the main frame, it is to be understood that these parts may be modified in form and that any equivalent devices which will form a hinge connection between the frame and the magazine and permit ready removal of the latter may be employed. It will also be understood by the skilled mechanic that the latches for sustaining the lower end of the magazine in operative position under the frame may be modified in form or replaced by any equivalent devices which will permit speedy connection and disconnection of the parts.

The operation of the parts is as follows: The finger-keys being operated in the order in which the matrices are to appear in print, the corresponding escapement-slides D are raised and lowered and the matrices released one at a time. They descend through the various converging channels and arrive in proper order in front of the star-wheel H in the assembler G, by which they are assembled in line. The space-key being actuated, the wedge spacers or justifiers are dropped into the line at proper intervals from the centrally-located magazine P. After the line has been transferred to and used in front of the mold it is shifted to the elevator K, by which it is lifted to the top of the machine and presented in front of the pusher R. The elevator throws the pusher-carrying pinion $r^5$ into engagement with the actuating-screw, whereupon the line is immediately pushed forward with a yielding pressure out of the elevator, which descends toward the lifting-dog $l^4$, by which the matrices are presented to the carrying-screws, which in turn move them along the distributer-bar to the points of delivery, whence they fall through the throat or guide T into the lower and upper sections of the magazine, as the case may be.

It is to be noted that journals at the upper end of the magazine form, in effect, a hinged connection with the main frame and that when the magazine swings downward and forward the escapements are automatically disconnected from the actuating-reeds E, so that access to the end of the magazine, the escapements, and the reeds is permitted. It is also to be noted that connection is made to the escapements for the purpose of operating them wholly on the upper side of the magazine and that their actuating-reeds are located wholly outside of the raceway F. This arrangement avoids the necessity of extending the operating devices through the magazine and exposes all the parts in such position that they may be readily inspected, cleaned, and lubricated. In ordinary machines the escapements and the connecting parts are located beneath the magazine and in such position that access to them is impossible unless the magazine is first moved from its operative position.

My improvements are of course applicable in all typographic machines analogous to the linotype—that is to say, machines in which matrices, dies, or type are carried in a magazine, composed in line, and thereafter distributed to the magazine.

Having described my invention, what I claim is—

1. In a typographic machine, a main frame having the upper end extended forward, in combination with a magazine detachably applied to the under side of the extended portion, whereby the removal and replacement of the magazine are facilitated.

2. In a typographic machine, a main frame having its upper end inclined, in combination with a magazine applied to and removable from the under side of the inclined portion.

3. In a typographic machine, a main frame having an overhanging upper portion, in combination with a detachable magazine, means for suspending the magazine, and means for locking the magazine on the under side of the overhanging portion, in operative position, substantially as described.

4. In a typographic machine, the main frame with the overhanging portion provided with ears, $a$, in combination with a detachable magazine having trunnions to engage the ears, and latches to lock the lower end of the magazine up in operative position.

5. In a typographic machine, a detachable magazine provided with means for suspending it at its upper end from the main frame, in combination with the main frame and means for securing the magazine in an inclined position beneath the supporting portion of the frame, whereby the application and removal of the magazine are permitted without lifting it from the top of the frame.

6. In a typographic machine, a main frame, escapement-actuating devices mounted therein, a magazine having escapements engaged by said devices, and a hinged connection between the magazine and main frame, so located that the swinging motion of the magazine thereon will disengage its escapements from the actuating devices.

7. The detachable magazine for a typographic machine, comprising two parallel chambers or magazines, rigidly connected and provided with escapement devices, and with supporting devices at the receiving end to engage the main frame, whereby it is adapted for ready application and removal as a whole.

8. In a typographic machine, a main frame, a channeled guide or raceway, F, fixed in position to conduct the matrices from the magazine to the assembling-point, a magazine pivoted directly to the frame at the end remote from the assembler, and means for locking the lower end of the magazine in operative position, whereby the delivery end of the magazine may be placed in operative relation to the raceway, or disconnected therefrom and exposed, without removal of the magazine from the machine.

9. In a typographic machine, a raceway comprising two groups of channels, those of each group converging toward their lower ends from the right and left, and also two converging throats, $f$, $f$, to receive the matrices from the respective groups and deliver them at a common point, in combination with means for delivering expansible spacers between the throats, $f$, $f$.

10. In a typographic machine, an inclined raceway with converging channels, through which the matrices are delivered from the right and left to a central point, in combination with means for delivering the spacers to the line at a central point between the converging channels.

11. In a typographic machine, assembling devices to receive matrices and spacers, a magazine for expansible spacers arranged directly over the assembling-point, that the spacers may fall directly thereto, and a raceway with converging channels, to direct the matrices to the assembling-point, said raceway being laterally inclined to avoid the magazine for the spacers.

12. In a typographic machine, in combination with mechanism for assembling the matrices in line, the converging throats, $f$, $f$, and the throat-plate, $f^2$, adapted to receive matrices from both throats and pivoted to turn out of its operative position, substantially as shown, whereby access to the three throats and the assembling devices is permitted.

13. The spacer-magazine, having inclined supports for the upper ends of the spacers, in combination with the detaining-shoulders and the rocker, recessed as described, to lift the spacers one at a time clear of the shoulders and deliver them to the line.

14. In a typographic machine, in combination with the fixed guide, $k$, the sliding elevator, K, the lever and link for actuating the same, and the link, $k^4$, lever, $k^5$, and cam $k^7$, for actuating the first-named lever.

15. In the distributing mechanism of a typographic machine, the reciprocating pusher, provided with the frictionally-held pinion, in combination with the feed-screws and means for throwing the pinion into engagement with the two screws alternately.

16. In the distributing mechanism of a typographic machine, the two feed-screws, the reciprocating pusher provided with a frictionally-held pinion to engage the screws, the guide $r'$, whereon the pusher slides, and means for rocking the pusher around the guide to effect the engagement of the pinion with the two screws alternately.

17. The sliding pusher, R, its frictionally-held pinion, the feed-screws to engage the pinion, the guide $r'$, whereon the pusher travels, means for turning the guide to engage the pinion with the advancing screw, and the arm $r^9$ and the guide therefor, to hold the pinion in engagement during the advance of the pusher.

18. In a typographic machine and in combination with the distributing mechanism, a pusher to advance the composed line of matrices to the distributer, power-driven mechanism for advancing the pusher, and an elevator adapted to present the line to the pusher and to trip the driving mechanism into action.

19. In a typographic machine, the combination of a line-pusher, R, a screw for advancing the same, a yielding connection between the screw and pusher, an elevator to lift the line to the pusher, and means actuated by the elevator for throwing the yielding connection into engagement with the screw.

20. In combination with a line-pusher and a continuously-rotated screw, a yielding connection between the screw and the pusher, whereby the latter is permitted to stop or advance with variable speed.

21. In a typographic machine, the combination of a support for the line to be distributed, means for removing the matrices, one at a time, from the forward end of the line, a pusher to advance the line, a constantly-acting driving device, and a yielding connection between the same and the pusher, whereby the pusher is adapted to exert a continuing and yielding pressure against the line, as the latter is permitted to advance irregularly as the successive matrices are removed therefrom.

22. In a typographic machine, the combination of a distributer, a duplex magazine thereunder, and an intermediate duplex throat or guide, T, mounted on a horizontal axis at its lower end, whereby it is adapted to direct the matrices into the upper or lower section of the magazine.

23. In combination with the distributer and the duplex magazine, consisting of parallel chambers or sections, the intermediate throat, T, pivoted at its lower end and provided with two series of throats or passages for directing matrices to the upper and lower sections of the magazine, respectively.

24. In combination with the distributer and the duplex magazine, the intermediate hinged throat, T, and the lever and cam for moving and locking the same.

25. In a typographic machine, a magazine for matrices, in combination with a reciprocating escapement having lips adapted to engage opposite edges of the matrices.

26. In a typographic machine, the combination of the magazine channeled to guide the matrices, with a slide extending transversely thereto, provided with lips to engage the matrices at opposite edges, substantially as described and shown.

27. In a typographic machine, the magazine channeled to guide the matrices, in combination with the matrices having shoulders at the two ends, and reciprocating escapements having lips adapted to engage the matrices at opposite edges.

28. In a typographic machine, a magazine having channels to guide the matrices, in combination with a matrix-controlling escapement provided with two matrix-detaining shoulders and arranged to reciprocate bodily through the magazine, at right angles to the direction in which the matrices travel.

29. In a typographic machine, a magazine having parallel chambers, in combination with sliding escapements arranged in pairs, those of each pair seated in a single slot.

30. In a typographic machine, the magazine, the sliding escapement extended therethrough, the lever and reed for moving the escapement in one direction, and a spring applied to move it in the opposite direction.

31. In a typographic machine, the combination of a magazine having two parallel sections or compartments, two escapements extending therethrough side by side, an actuating device engaging both escapements, and means whereby either escapement can be locked out of action at will.

32. In a typographic machine, an inclined magazine, and a throat or raceway to which the magazine delivers the matrices, in combination with an escapement projecting on the upper side of the magazine, an actuating-reed outside of the raceway, and a connection thence to the escapement, whereby the escapement-actuating devices are exposed on the outside of the machine and free access to them permitted at all times.

33. In a typographic machine, the combination of an inclined magazine, a raceway arranged to receive matrices therefrom, escapement-actuating reeds arranged outside of and extending above the raceway, and connected with the escapements above the magazine.

In testimony whereof I hereunto set my hand, this 12th day of December, 1904, in the presence of two attesting witnesses.

PHILIP T. DODGE.

Witnesses:
JOHN F. GEORGE,
K. L. BRENNAN.